(12) United States Patent
Akkapeddi (10) Patent No.: US 12,093,742 B2
(45) Date of Patent: *Sep. 17, 2024

(54) SYSTEM AND METHOD FOR DYNAMICALLY RESIZING COMPUTATIONAL INFRASTRUCTURE TO ACCOMMODATE UNEXPECTED DEMANDS

(71) Applicant: BANK OF AMERICA CORPORATION, Charlotte, NC (US)

(72) Inventor: Naga Vamsi Krishna Akkapeddi, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/477,357

(22) Filed: Sep. 28, 2023

(65) Prior Publication Data
US 2024/0036933 A1    Feb. 1, 2024

Related U.S. Application Data

(63) Continuation of application No. 17/070,195, filed on Oct. 14, 2020, now Pat. No. 11,809,910.

(51) Int. Cl.
| | | |
|---|---|---|
| G06F 9/50 | (2006.01) | |
| G06F 11/34 | (2006.01) | |
| G06F 16/21 | (2019.01) | |
| G06N 20/00 | (2019.01) | |

(52) U.S. Cl.
CPC ............ *G06F 9/505* (2013.01); *G06F 9/5027* (2013.01); *G06F 11/3433* (2013.01); *G06F 16/219* (2019.01); *G06N 20/00* (2019.01); *G06F 9/50* (2013.01); *G06F 9/5011* (2013.01); *G06F 9/5016* (2013.01); *G06F 9/5044* (2013.01); *G06F 2209/5019* (2013.01)

(58) Field of Classification Search
None
See application file for complete search history.

(56) References Cited

U.S. PATENT DOCUMENTS

| | | |
|---|---|---|
| 6,904,335 B2 | 6/2005 | Solomon |
| 7,047,861 B2 | 5/2006 | Solomon |
| 8,060,614 B2 | 11/2011 | Goldstein et al. |
| 8,140,523 B2 | 3/2012 | Fakhouri et al. |
| 8,144,590 B2 | 3/2012 | Broberg et al. |

(Continued)

*Primary Examiner* — Qing Yuan Wu (57) ABSTRACT

A system includes a subsystem, a database, a memory, and a processor. The subsystem includes a computational resource associated with a resource usage and having a capacity corresponding to a maximum resource usage value. The database stores training data that includes historical resource usages and historical events. The memory stores a machine learning algorithm that is trained, based on the training data, to predict, based on the occurrence of an event, that a future value of the resource usage at a future time will be greater than the maximum value. The processor detects that the event has occurred. In response, the processor applies the machine learning algorithm to predict that the future value of the resource usage will be greater than the maximum value. Prior to the future time, the processor increases the capacity of the computational resource to accommodate the future value of the resource usage.

17 Claims, 4 Drawing Sheets

(56) References Cited

U.S. PATENT DOCUMENTS

| | | |
|---|---|---|
| 8,261,033 B1 | 9/2012 | Slik et al. |
| 8,285,298 B2 | 10/2012 | Noriega et al. |
| 8,578,348 B2 | 11/2013 | Fliess et al. |
| 8,606,844 B2 | 12/2013 | Kaufman et al. |
| 8,612,071 B2 | 12/2013 | Chun |
| 8,812,653 B2 | 8/2014 | Chandrasekaran |
| 8,849,469 B2 | 9/2014 | Belady et al. |
| 8,849,761 B2 | 9/2014 | Prahlad et al. |
| 8,874,477 B2 | 10/2014 | Hoffberg |
| 8,938,696 B1 | 1/2015 | Torunoglu et al. |
| 9,015,708 B2 | 4/2015 | Choudhury et al. |
| 9,104,494 B2 | 8/2015 | Kami |
| 9,143,392 B2 | 9/2015 | Duchesneau |
| 9,208,032 B1 | 12/2015 | McAlister et al. |
| 9,210,100 B2 | 12/2015 | Van Der Linden et al. |
| 9,251,517 B2 | 2/2016 | Bonilla et al. |
| 9,584,597 B2 | 2/2017 | James et al. |
| 9,606,822 B2 | 3/2017 | Hunt et al. |
| 9,641,592 B2 | 5/2017 | Thompson et al. |
| 9,646,067 B2 | 5/2017 | Abercrombie et al. |
| 9,721,046 B2 | 8/2017 | Khainson et al. |
| 9,772,916 B2 | 9/2017 | Rangasamy |
| 9,792,060 B2 | 10/2017 | Wei et al. |
| 9,858,095 B2 | 1/2018 | Breitgand et al. |
| 9,860,190 B2 | 1/2018 | Doganata et al. |
| 9,880,756 B2 | 1/2018 | Mutalik et al. |
| 9,967,327 B2 | 5/2018 | Moorthi et al. |
| 10,062,354 B2 | 8/2018 | Dutt |
| 10,210,567 B2 | 2/2019 | Mick et al. |
| 10,332,320 B2 | 6/2019 | Lakshamanan et al. |
| 10,349,332 B2 | 7/2019 | Agee et al. |
| 2010/0318999 A1 | 12/2010 | Zhao et al. |
| 2013/0268940 A1* | 10/2013 | Gmach ............... G06F 9/5077 718/104 |
| 2015/0169291 A1 | 6/2015 | Dube et al. |
| 2015/0227601 A1 | 8/2015 | Ramu et al. |
| 2018/0302807 A1 | 10/2018 | Chen et al. |
| 2019/0164080 A1* | 5/2019 | Stefani ............... G06F 9/45558 |
| 2019/0245757 A1 | 8/2019 | Meyer et al. |
| 2020/0076875 A1 | 3/2020 | Sabella et al. |

\* cited by examiner

SYSTEM AND METHOD FOR DYNAMICALLY RESIZING COMPUTATIONAL INFRASTRUCTURE TO ACCOMMODATE UNEXPECTED DEMANDS

CROSS-REFERENCE TO RELATED APPLICATIONS

This application is a continuation of U.S. patent application Ser. No. 17/070,195 filed Oct. 14, 2020, and entitled "SYSTEM AND METHOD FOR DYNAMICALLY RESIZING COMPUTATIONAL INFRASTRUCTURE TO ACCOMMODATE UNEXPECTED DEMANDS," now U.S. Pat. No. 11,809,910 issued Nov. 7, 2023, which is incorporated herein by reference.

TECHNICAL FIELD

The present disclosure relates generally to memory and processing resource usage during multicomputer data transfers in digital processing systems, and more particularly, to a system and method for dynamically resizing computational infrastructure to accommodate unexpected demands.

BACKGROUND

Computational systems maintained by large organizations often include multiple subsystems that cooperatively process data. The infrastructure supporting these subsystems is typically sized based on the computational demands that each subsystem is expected to experience. This infrastructure sizing is generally static and predetermined. As a result, the pre-sized infrastructure is ill-equipped to meet unexpected computational demands.

SUMMARY

Organizations often maintain multiple computational subsystems that they use to cooperatively process data. For example, a first application operating on a first subsystem may generate, as output, a set of data that is used, as input, by a second application operating on a second subsystem. The infrastructure supporting these subsystems is typically sized based on the computational demands that each system is expected to experience. For example, each subsystem may be provided with an amount of memory, CPUs, and/or external storage space that is sized to accommodate the maximum computational demands expected to be experienced by the subsystem. This infrastructure sizing is generally static and predetermined.

Occasionally, however, unexpected events may occur that lead to unusually large demands on the computational resources of one or more of the subsystems. Because these subsystems were initially provisioned with amounts of resources suitable to meet expected demands, they may be unable to support any unexpected increases in demand. As a result, one or more applications running on the subsystems may fail. While overprovisioning the subsystems during development may enable the subsystems to accommodate any unexpected increases in demand, this is typically not desirable because the extra resources assigned to the subsystems typically sit idle for a majority of the time, when they could be used for other purposes.

This disclosure contemplates a real-time capacity optimizing tool that may be used to monitor a set of subsystems and to identify events (both internal and external to the system) that may lead to an overutilization of the computational resources of one or more of the subsystems. In particular, the tool uses a machine learning algorithm to predict that the occurrence of an event may lead to future increases in the demand for one or more of the computational resources that may overwhelm those resources. In response to identifying a computational resource that may be subject to increased future demand that will overwhelm the resource, the tool may dynamically increase the capacity of the computational resource, such that the capacity is sufficient to accommodate the predicted future demand. An embodiment of the tool is described below.

According to an embodiment, a system includes a first subsystem, a database, a memory, and a hardware processor communicatively coupled to the memory. The first subsystem includes a first computational resource. The first computational resource has a capacity and is associated with a resource usage. The capacity of the first computational resource corresponds to a maximum value of the resource usage of the first computational resource. The database stores training data. The training data includes a set of historical data for the first subsystem, and a first set of historical events. The set of historical data includes values of the resource usage of the first computational resource over a period of time. Each historical event of the first set of historical events occurs at an event time and is associated with an increase in the resource usage of the first computational resource occurring at a time later than the event time. The memory stores a machine learning algorithm. The machine learning algorithm is trained, based on the training data, to predict, based on the occurrence of an event, that a future value of the resource usage of the first computational resource at a future time will be greater than the maximum value of the resource usage of the first computational resource. The hardware processor detects that the event has occurred. In response to detecting that the event has occurred, the processor applies the machine learning algorithm to predict, based on the occurrence of the event, that the future value of the resource usage of the first computational resource at the future time will be greater than the maximum value of the resource usage of the first computational resource. Prior to the future time, the processor also increases the capacity of the first computational resource, such that the increased capacity of the first computational resource corresponds to a new maximum value of the resource usage of the first computational resource. The new maximum value is greater that the future value.

Certain embodiments provide one or more technical advantages. As an example, an embodiment uses a machine learning algorithm to automatically identify events that may lead to increased demand on the computational resources of one or more subsystems within a larger system. As another example, an embodiment dynamically resizes one or more computational resources to accommodate predicted future increases in the demand for those resources. As a further example, an embodiment conserves computational resources by avoiding a need to overprovision subsystems in order to accommodate potential unexpected increases in resource demand. The system described in the present disclosure may particularly be integrated into a practical application of a computational resource capacity optimizing tool for use by an organization to help prevent failures of applications running on the organization's computational resources by identifying events that may lead to an overutilization of one or more of those computational resources, and adjusting the capacities of the resources accordingly.

Certain embodiments may include none, some, or all of the above technical advantages. One or more other technical advantages may be readily apparent to one skilled in the art form the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 4 of the drawings, like numerals being used for like and corresponding parts of the various drawings.

I. System Overview

Figure 1:
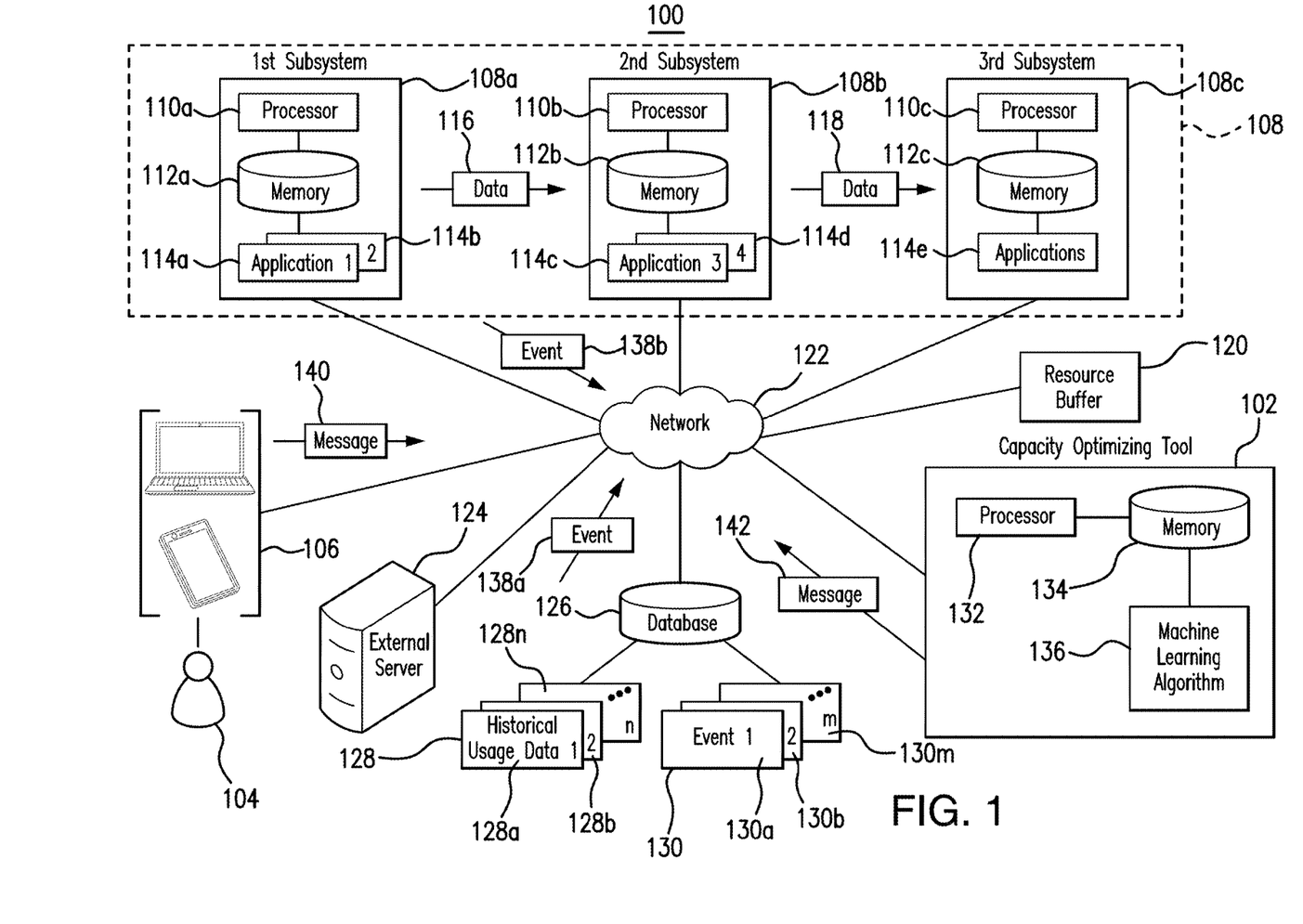
FIG. 1 illustrates an example computational resource capacity optimization system.

FIG. 1 illustrates an example computational resource capacity optimization system 100 that includes capacity optimizing tool 102, user(s) 104, device(s) 106, subsystems 108a through 108c, resource buffer 120, network 122, external server 124, and database 126. Generally, capacity optimizing tool 102: (1) monitors subsystems 108 and/or external server 124 for events 138a/b that may lead to unexpected increases in the demand for any of the computational resources (e.g., processor resources 110, memory resources 112, application resources 114) of subsystems 108a through 108c; (2) detects one or more events 138a/b that the tool predicts will lead to demands on one or more of the computational resources of subsystems 108a through 108c that may overwhelm the resource(s); and (3) in response to detecting such event(s), dynamically increases the size of the computational resource(s) of subsystems 108a through 108c. The manner by which capacity optimizing tool 102 performs such tasks will be described in further detail below, in the discussion of FIGS. 2 through 4.

Devices 106 are used by users 104 located on network 122 to communicate with capacity optimizing tool 102 and/or subsystems 108a through 108c. As an example, in certain embodiments, user 104 may use device 106 to transmit a message 140 to at least one of first subsystem 108a, second subsystem 108b, and third subsystem 108c, instructing the subsystem to execute an application 114 stored in the memory 112 of the subsystem. As another example, in certain embodiments, user 104 may use device 106 to transmit data 140 to at least one of first subsystem 108a, second subsystem 108b, and third subsystem 108c, for use by an application 114 installed on the subsystem. As another example, in certain embodiments, user 104 may use device 106 to receive a message 142 from capacity optimizing tool 102, notifying user 104 that the tool has performed an action on one or more of subsystems 108a through 108c to (1) prevent a potential future increase in resource demand from overwhelming one or more of the computational resources 110/112 of subsystems 108a through 108c, and/or (2) release extra capacity from one or more of the computational resources 110/112 of subsystem 108a through 108c.

Devices 106 include any appropriate device for communicating with components of system 100 over network 122. For example, devices 106 may be a telephone, a mobile phone, a computer, a laptop, a wireless or cellular telephone, a tablet, a server, an IoT device, and/or an automated assistant, among others. This disclosure contemplates devices 106 being any appropriate device for sending and receiving communications over network 122. Device 106 may also include a user interface, such as a display, a microphone, keypad, or other appropriate terminal equipment usable by user 104. In some embodiments, an application executed by a processor of device 106 may perform the functions described herein.

Subsystems 108a through 108c include any systems capable of receiving data, processing data, generating data, transmitting data, and/or performing any other suitable functions. For example, as illustrated in FIG. 1, first subsystem 108a is a system configured to transmit output data 116 to second subsystem 108b; second subsystem 108b is a system configured to receive output data 116, process data 116, generate its own output data 118, and transmit output data 118 to third subsystem 108c; third subsystem 108c is a system configured to receive and process output data 118. Data 116/118 may be any type of data. For example, data 116/118 may include an image, a video, an audio file, a spreadsheet, a text file, a source code file, a binary file, an HTML file, a combination of the preceding, or any other suitable form of data. In certain embodiments, data 116/118 may be core data (e.g., the core data within the organization to which subsystems 108a through 108c belong). While illustrated in FIG. 1 as including three subsystems 108a through 108c, system 100 may include any number of subsystems 108.

Each subsystem 108a through 108c includes and/or is otherwise associated with one or more computational resources. For example, subsystem 108a includes processor 110a and memory 112a, subsystem 108b includes processor 110b and memory 112b, and subsystem 108c includes processor 110c and memory 112c. Each processor 110a through 110c has a capacity and is associated with a resource usage corresponding to a percentage of the total capacity. For example, processor 110a may correspond to one or more CPUs having a total capacity of 3.4 GHz and a resource usage anywhere between 0 and 3.4 GHz. Similarly, each memory 112a through 112c has a capacity and is associated with a resource usage corresponding to a percentage of the total capacity. As an example, memory 112a may correspond to RAM having a capacity of 4 GB and a resource usage between 0 and 4 GB. As another example, memory 112a may correspond to a storage device having a capacity of 1 TB and a resource usage between 0 and 1 TB.

In certain embodiments, subsystems 108a through 108c may include cloud-based servers. For example, subsystems 108a through 108c may include virtual servers running in a cloud computing environment that is offered by a hosting provider. In some embodiments, subsystems 108a through 108c may include on-premises, physical servers. For example, subsystems 108a through 108c may include physical servers located in a datacenter operated by an organization running capacity optimizing tool 102.

Processors 110a through 110c of subsystems 108a through 108c are any electronic circuitry, including, but not limited to central processing units (CPUs), graphics processing units (GPUs), microprocessors, application specific integrated circuits (ASIC), application specific instruction set processor (ASIP), and/or state machines, that communicatively couple to memories 112a through 112c and control the operations of subsystems 108a through 108c.

Processors 110a through 110c may be 8-bit, 16-bit, 32-bit, 64-bit or of any other suitable architecture. Processors 110a through 110c may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processors 110a through 110c may include other hardware and software that operates to control and process information. Processors 110a and 110c execute software stored on memory to perform any of the functions described herein. Processors 110a through 110c each control the operation and administration of their corresponding subsystem 108a through 108c by processing information received from device(s) 106, any of the other subsystems 108a through 108c, resource buffer 120, network 122, external server 124, database 126, and/or corresponding memory of memories 112a through 112c. Processors 110a through 110c may be programmable logic devices, microcontrollers, microprocessors, any suitable processing devices, or any suitable combination of the preceding. Processors 110a through 110c are not limited to single processing devices and may encompass multiple processing devices.

Memories 112a through 112c of subsystems 108a through 108c may store, either permanently or temporarily, data, operational software, or other information for the corresponding processor 110a through 110c. Memories 112a through 112c may include any one or a combination of volatile or non-volatile local or remote devices suitable for storing information. For example, memories 112a through 112c may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in each of memories 112a through 112c, a disk, a CD, or a flash drive. In particular embodiments, the software may include an application executable by the corresponding processor 110a through 110c to perform one or more of the functions described herein.

In certain embodiments, memories 112a through 112c of subsystems 108a through 108c also store computer readable instructions in the form of one or more applications 114. For example, memory 112a of first subsystem 108a may store computer readable instructions corresponding to first application 114a and/or second application 114b, memory 112b of second subsystem 108b may store computer readable instructions corresponding to third application 114c and/or fourth application 114d, and memory 112c of third subsystem 108c may store computer readable instructions corresponding to fifth application 114e. Applications 114a through 114e may be any applications configured, when executed by processors 110, to receive input data, process input data, generate output data, transmit output data, and/or perform any other suitable functions. When executing, applications 114a through 114e consume at least a portion of computational resources 110/112. For example, when executing on processor 110a, first application 114a is associated with a first resource usage of processor 110a and a first resource usage of memory 112a and second application 114b is associated with a second resource usage of processor 110a and a second resource usage of memory 112a.

In certain embodiments, applications 114 are associated with internal events 138b. Internal events 138b include any events that may lead to an unexpected and/or unusual increase in computational resource consumption by any of subsystems 108a through 108c. As an example, an internal event 138b may correspond to the presence of an infinite loop within one of applications 114a through 114e. For example, the presence of an infinite loop within first application 114a may result in first subsystem 108a continuously generating output data 116, which it then sends to second subsystem 108b. As another example, an internal event 138b may correspond to an application 114 processing an unusually complex set of inputs, leading to a long running job. As a further example, an internal event 138b may correspond to an application 114a (executing on subsystem 108a) updating core data 116 and transmitting the all or a portion of the updated core data 116 to one or more of subsystems 108b and 108c.

Resource buffer 120 includes computational resources that may be added to any of subsystems 108a through 108c to increase the capacity of the existing computational resources 110/112 assigned to those subsystems. For example, resource buffer 120 may include processing resources (e.g., CPUs, GPUs, etc.) that may be added to the processing resources 110a of first subsystem 108a, the processing resources 110b of second subsystem 108b, and/or the processing resources 110c of third subsystem 108c. Similarly, resource buffer 120 may include memory resources (e.g., RAM, storage devices, etc.) that may be added to the memory resources 112a of first subsystem 108a, the memory resources 112b of second subsystem 108b, and/or the memory resources 112c of third subsystems 108c. The computational resources in resource buffer 120 may be added to any of subsystems 108a through 108c in any suitable manner. As an example, in certain embodiments, resource buffer 120 corresponds to virtual resources available in a cloud computing environment. In such embodiments, capacity optimizing tool 102 may submit a request 142 to the cloud computing host, requesting that computational resources from resource buffer 120 be added to one or more of subsystems 108a through 108c. As another example, in certain embodiments, resource buffer 120 corresponds to physical computational resources available to an organization. In certain such embodiments, capacity optimizing tool 102 may send an instruction 142 to a system administrator, instructing the administrator to add computational resources from resource buffer 120 to one or more of subsystems 108a through 108c. As a further example, in some embodiments, subsystems 108a through 108c may be directly connected to resource buffer 120 (e.g., resource buffer 120 is a shared pool of configurable computing resources accessible to each of subsystems 108a through 108c). In such embodiments, capacity optimizing tool 102 may allocate a portion of the computational resources in buffer 120 to one or more subsystems 108a through 108c and instruct the subsystems to use these resources.

Network 122 facilitates communication between and amongst the various components of system 100. This disclosure contemplates network 122 being any suitable network operable to facilitate communication between such components. Network 122 may include any interconnecting system capable of transmitting audio, video, signals, data, messages, or any combination of the preceding. Network 122 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. For example, in certain embodiments, network 122 represents both an internal, local network that facilitates communication between capacity optimizing tool 102 and devices 106, subsystems 108, and/or database 126, as well as an external network that facilitates communication between capacity optimizing tool 102 and external server 124.

External server 124 corresponds to any external system from which capacity optimizing tool 102 may obtaining information related to external events 138a. External events 138a may include any events that may lead to an increase in resource consumption by any of subsystems 108a through 108c. For example, an external event 138a may correspond to the announcement/launch of a new consumer good or service, a weather event, a political event, a sporting event, and/or any other event that may affect the organization to which subsystems 108a through 108c belong in a manner that leads to an increase in resource consumption by any of subsystems 108a through 108c. In certain embodiments, external server 124 publishes publicly available information that capacity optimizing tool 102 may access over network 122 in order to determine that an external event 138a has occurred. For example, in certain embodiments, external server 124 is a web server associated with one or more websites accessible to capacity optimizing tool 102 over network 122. While, for simplicity, FIG. 1 illustrates a single external server 124, system 100 may include any number of external servers 124, accessible to capacity optimizing tool 102 over network 122.

Database 126 stores historical usage data 128 and historical events 130. Historical usage data 128 includes historical values of the resource usages of subsystems 108a through 108c over time. For example, for each subsystem 110a through 110c, database 126 may store historical data 128a through 128c, respectively, corresponding to the historical resource usages of processors 110a through 110c and memories 112a through 112c, collected from the subsystems over time. For each subsystem 110, historical data 124 may include the percentage and/or absolute usages of the subsystem's processor 110 and/or memory 112 over time. In some embodiments, historical data 124 may include the percentage and/or absolute usages of processors 110a through 110c and memories 112a through 112c by each application 114a through 114e executing on subsystem 108a through 108c. In certain embodiments, historical data 128 is collected from each subsystem 108 at regular time intervals. For example, historical data 128 may be collected from each subsystem 108 every second, minute, or any other appropriate time interval. In some embodiments, historical data 128 may be collected from each subsystem 108 at irregular intervals.

Historical events 130 include any historical events that may have affected the past resource usages of any of subsystems 108a through 108c. Historical events 130 may include past external events 138a as well as past internal events 138b. For example, historical events 130a through 130m may include: (1) announcements/launches of new consumer goods or services; (2) weather events; (3) political events; (4) sports events; (5) updates to core data; (6) an infinite loop or other error present in an application 114; (7) a long running job executing on a subsystem 108; and/or (8) any other internal or external past event that may have led to an increase in the consumption of one or more computational resources 110/112 of subsystems 108a through 108c.

As seen in FIG. 1, capacity optimizing tool 102 includes a processor 132 and a memory 134. This disclosure contemplates processor 132 and memory 134 being configured to perform any of the functions of capacity optimizing tool 102 described herein. Generally, capacity optimizing tool 102: (1) collects resource usage data from subsystems 108a through 108c and stores it as historical usage data 128 in database 126; (2) monitors for external events 138a and internal events 138b that may lead to an unexpected increase in the consumption of computational resources by any of subsystems 108a through 108c; (3) applies machine learning algorithm 136 to predict that a given event 138a/b will lead to an increased demand on the computational resources of one or more subsystems 108a through 108c, as described in further detail below, in the discussion of FIG. 2; and (4) dynamically resizes the computational resources associated with the increased demand, as described in further detail below, in the discussion of FIGS. 2 and 3. In certain embodiments, capacity optimizing tool 102 may additionally predict that a given event 138a/b will lead to a given application 114 consuming an increased amount of the computational resources of a subsystem 108, and alert any other applications sharing those computational resources of this prediction, as described in further detail below, in the discussion of FIG. 4.

Processor 132 is any electronic circuitry, including, but not limited to central processing units (CPUs), graphics processing units (GPUs), microprocessors, application specific integrated circuits (ASIC), application specific instruction set processor (ASIP), and/or state machines, that communicatively couples to memory 134 and controls the operation of capacity optimizing tool 102. Processor 132 may be 8-bit, 16-bit, 32-bit, 64-bit or of any other suitable architecture. Processor 132 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 132 may include other hardware and software that operates to control and process information. Processor 132 executes software stored on memory to perform any of the functions described herein. Processor 132 controls the operation and administration of capacity optimizing tool 102 by processing information received from device(s) 106, subsystems 108a through 108c, resource buffer 120, network 122, external system 124, database 126, and/or memory 134. Processor 132 may be a programmable logic device, a microcontroller, a microprocessor, any suitable processing device, or any suitable combination of the preceding. Processor 132 is not limited to a single processing device and may encompass multiple processing devices.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 134, a disk, a CD, or a flash drive. In particular embodiments, the software may include an application executable by processor 132 to perform one or more of the functions described herein.

In certain embodiments, memory 134 also stores machine learning algorithm 136. Machine learning algorithm 136 is any algorithm that has been trained to predict that an external event 138a and/or internal event 138b may lead to an increase in the consumption of any of computational resources 110a though 110c and/or 112a through 112c. As an example, machine learning algorithm 136 may be trained to predict that an event 138a/b may lead to an increase in the consumption of computational resources 110a and/or 112a of subsystem 108a at a time in the future. As another example, machine learning algorithm 136 may be trained to predict that an event 138a/b may lead to an increase in the consumption of computational resources 110a and/or 112a of subsystem 108a by application 114a at a time in the future. In certain embodiments, machine learning algorithm 136 is trained to identify the time at which the increased consumption is likely to begin. In some embodiments, machine learning algorithm 136 is trained to identify a range of time over which the increased consumption is likely to occur. Machine learning algorithm 136 may be a linear/logistic regression algorithm, a decision tree, a neural network, and/or any other suitable machine learning algorithm.

Machine learning algorithm 136 may be trained to predict that an event 138a/b may lead to an increase in the consumption of any of computational resources 110a through 110c and/or 112a through 112c in any suitable manner. As an example, in certain embodiments, machine learning algorithm 136 is trained using historical usage data 128 and historical events 130 stored in database 126. For example, the training process may include machine learning algorithm 136 learning to recognize patterns in historical usage data 128 and historical events 130 (for example, how the historical resource usages 128a through 128n are affected by certain historical events 130a through 130m) and to apply this learning to new events 138a/b, to make predictions about the effect of these on future resource usage values. In certain embodiments, capacity optimizing tool 102 trains machine learning algorithm 136. In some embodiments, machine learning algorithm 136 is trained by an external system.

Modifications, additions, or omissions may be made to the systems described herein without departing from the scope of the invention. For example, system 100 may include any number of users 104, devices 106, subsystems 108a through 108c, resource buffers 120, networks 122, external systems 124, and databases 126. The components may be integrated or separated. Moreover, the operations may be performed by more, fewer, or other components. Additionally, the operations may be performed using any suitable logic comprising software, hardware, and/or other logic.

II. Dynamically Resizing Computational Resources to Accommodate Future Demand

Figure 2:
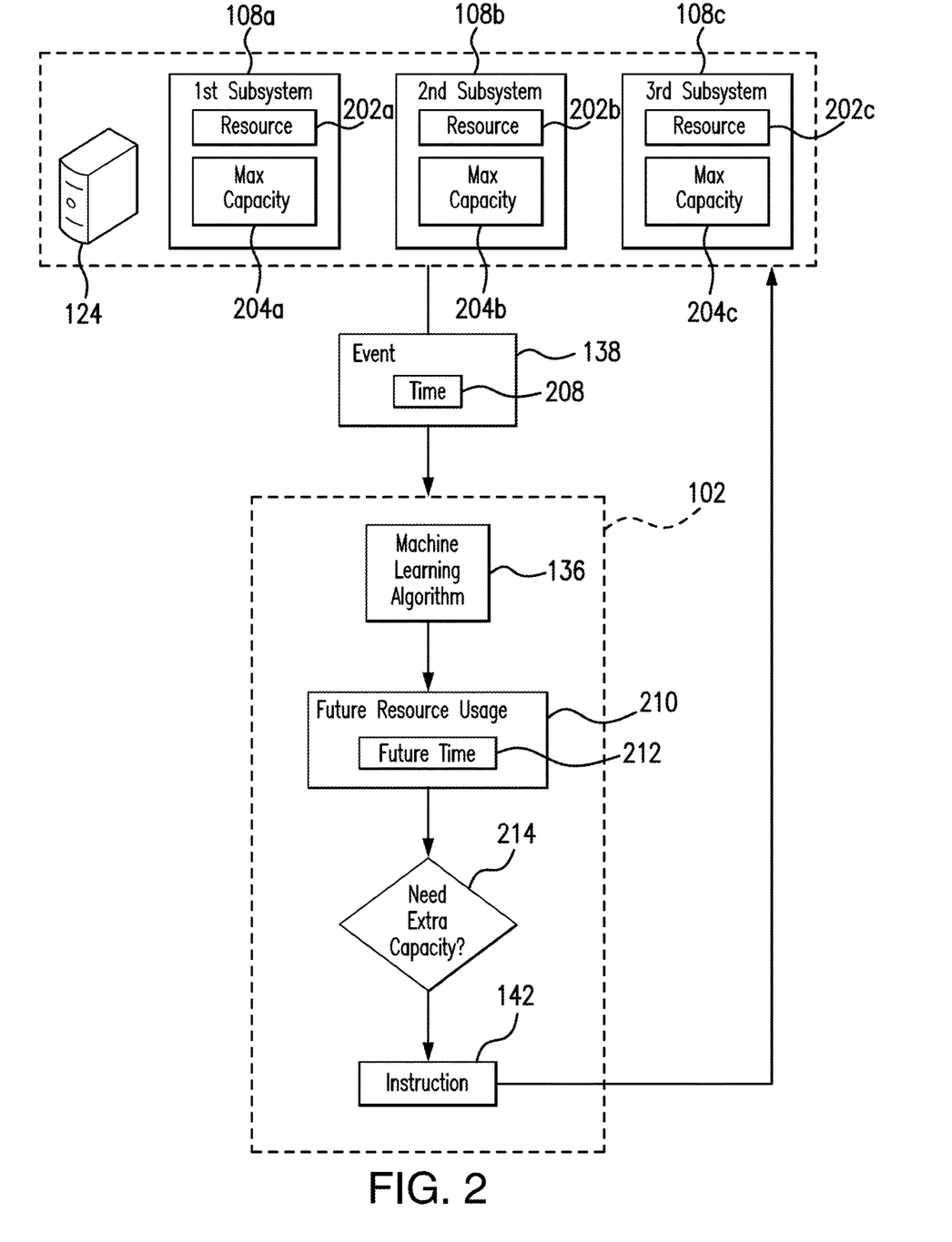
FIG. 2 illustrates an example of the process by which the capacity optimizing tool of the system of FIG. 1 identifies an event as likely leading to an increased demand on the computational resources of one or more subsystems, and adjusts the capacities of these resources to accommodate this increased demand.

FIG. 2 presents an example of the process by which capacity optimizing tool 102 may predict that an event 138 will lead to an increased consumption of any of computational resources 202a through 202c, belonging to subsystems 108a through 108c, respectively. While FIG. 1 illustrates each subsystem 108a through 108c as including multiple computational resources (e.g., processors 110a through 110c and memories 112a through 112c), for simplicity, FIG. 2 illustrates each subsystem 108a through 108c as having a single computational resource 202a through 202c, respectively. Computational resources 202a through 202c may correspond to processors 110a through 110c, respectively, memories 112a through 112c, respectively, and/or any other suitable computational resources. Each computational resource 202a through 202c is associated with a maximum capacity 204a through 204c, respectively.

As illustrated in FIG. 2, capacity optimizing tool 102 monitors for events 138. An event 138 may correspond to an internal event associated with one or more subsystems 108a through 108c or an external event occurring outside of system 100. Capacity optimizing tool 102 may detect an internal event 138 by monitoring the computational resource usages of subsystems 108a through 108c, by monitoring communications to/from any of subsystems 108a through 108c, and/or in any other suitable manner. Capacity optimizing tool 102 may detect an external event 138 by monitoring information published by and/or otherwise available through one or more external servers 124. For example, where external server 124 corresponds to a web server, capacity optimizing tool 102 may detect an external event 138 using web scraping techniques.

In response to detecting the occurrence of an event 138 at time 208, capacity optimizing tool 102 applies machine learning algorithm 136 to predict the effect that the event 138 may have on the future resource usages 210 of subsystems 108a through 108c at a future time 212. For example, machine learning algorithm 136 may predict that the event will lead to an increased demand on computational resource 202b resulting in an increase future resource usage 210 of computational resource 202b, occurring at future time 212, where future time 212 can be any time from the time that event 138 occurred, onwards. In response to predicting future resource usage 210, capacity optimizing tool 102 performs decision 214, to determine whether computational resource 202b has available capacity to support future resource usage 210. For example, capacity optimizing tool 102 may determine whether future resource usage 210 is less than maximum capacity 204b.

In response to determining that computational resource 202b does not have available capacity to support future resource usage 210, capacity optimizing tool 102 generates instruction 142. Instruction 142 is an instruction to increase the capacity of computational resource 202b. In certain embodiments, instruction 142 is executed by capacity optimizing tool 102, prior to future time 212, to increase the capacity of computational resource 202b. For example, capacity optimizing tool 102 may dynamically add computational resources from buffer 120 to computational resource 202b to increase the capacity 204b of computational resource 202b, such that the capacity is able to support future resource usage 210. In certain embodiments where subsystems 108a through 108c are part of a cloud computing environment, instruction 142 may be transmitted to the hosting provider of subsystems 108a through 108c (e.g., a cloud computing host), for execution by the hosting provider. For example, instruction 142 may be a request for additional capacity to be added to computational resource 202b. In response to receiving such a request, the hosting provider may identify computational resources from resource buffer 120 (e.g., a shared pool of available computational resources) that are sufficient to accommodate this additional capacity, and dynamically allocate these resources to computational resource 202b, thereby increasing its capacity 204b. In some embodiments, capacity optimizing tool 102 may transmit instruction 142 to a system administrator 104, instructing the system administrator to physically adjust the computational resources 202b. For example, in response to receiving an instruction to increase the capacity of the RAM associated with subsystem 108b, a system administrator 104 may physically add one or more RAM cards to subsystem 108b.

In certain embodiments, machine learning algorithm 136 may predict that the demands on multiple computational resources 202a through 202c may increase in response to a given event 138. For example, in addition to predicting that the demand on computational resource 202b of subsystem 108b will increase in response to event 138, as described above, capacity optimizing tool 102 may also predict that the demand on computational resources 202a and/or 202c may increase in response to event 138. In response, capacity optimizing tool 102 may perform a similar process as that described above for computational resource 202b, increasing the capacities of computational resources 202a and/or 202c if the predicted future usages 210 of these resources exceed their available capacities 204a and 204c.

In certain embodiments, increasing the computational resources 202b of second subsystem 108b to accommodate future resource usage 210 at a future time 212 may lead to an increased demand on the computational resources 202c of third subsystem 108c after future time 212. For example, the increased demands on computational resources 202b may arise from an increased amount of data 116 arriving at second subsystem 108b for processing, as illustrated in FIG. 1. By increasing the capacity 204b of computational resources 202b, capacity optimizing tool 102 may enable second subsystem 108b to process data 116, which, in certain embodiments, may result in second subsystem 108b generating and transmitting an unexpectedly large amount of output data 118 to third subsystem 108c. The arrival of output data 118 may place increased demands on the computational resources 202c of third subsystem 108c. The manner by which capacity optimizing tool 102 may automatically act to address such a situation is described in detail below, in the discussion of FIG. 3.

Figure 3:
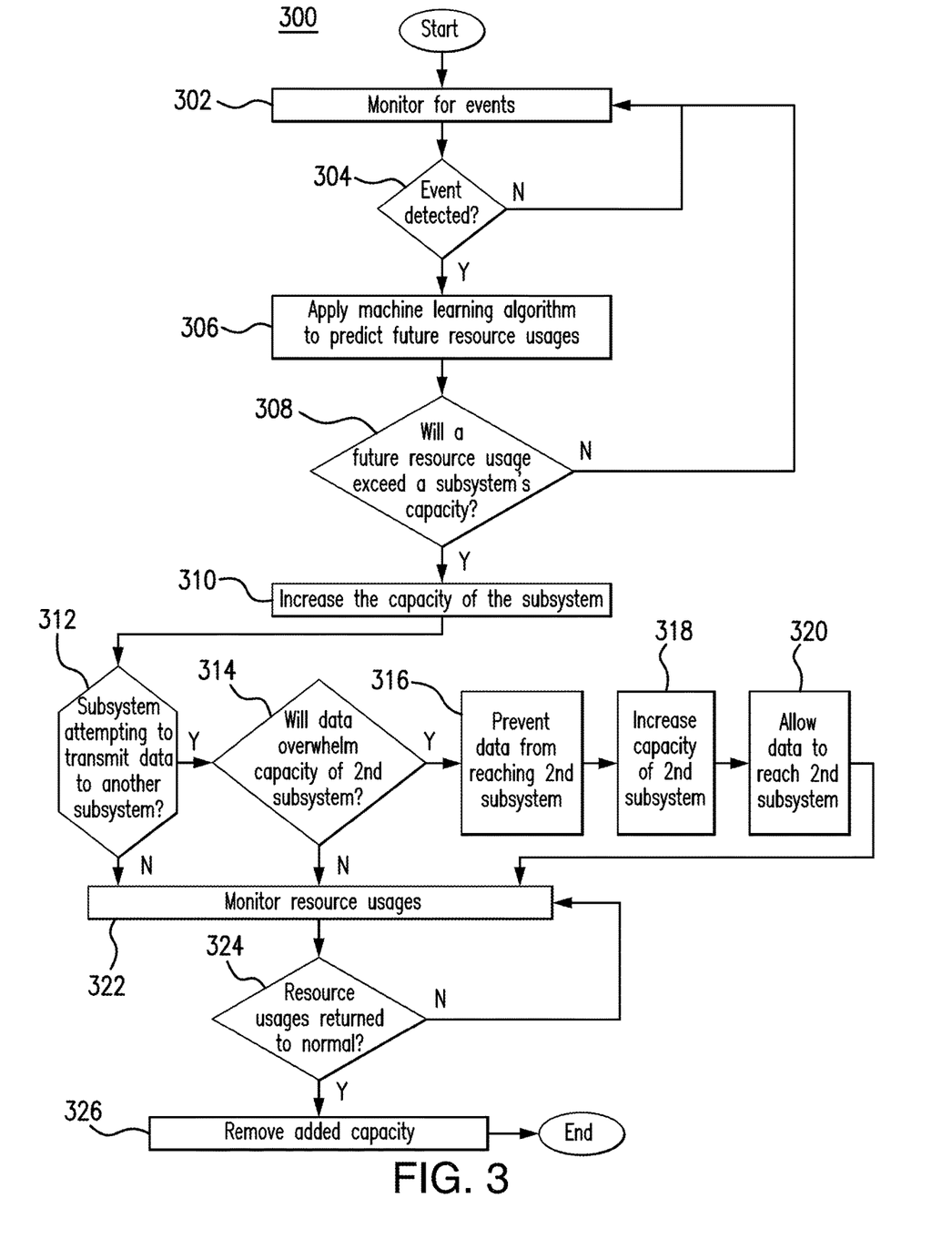
FIG. 3 presents a flowchart illustrating an example method by which the capacity optimizing tool of the system of FIG. 1 automatically adjusts the capacities of one or more computational resources within the system, to accommodate predicted increases in demand for these resources.

FIG. 3 presents a flowchart (described in conjunction with elements of FIG. 2) illustrating an example method 300 by which capacity optimizing tool 102 may automatically adjust the capacities 204a through 204c of computational resources 202a through 202c to accommodate increases in demand for these resources arising directly and/or indirectly from events 138. In step 302 capacity optimizing tool 102 monitors subsystems 108a through 108c and external server 124 for events 138 that may lead to increased demand on computational resources 202a through 202c. In step 304 capacity optimizing tool 102 determines whether the tool has detected such an event 138.

If, in step 304 capacity optimizing tool 102 determines that it has detected an event 138 that may lead to an increased demand on any of computational resources 202a through 202c, in step 306 capacity optimizing tool 102 applies machine learning algorithm 136 to predict future resource usages 210 for computational resources 202a through 202c. For example, capacity optimizing tool 102 may apply machine learning algorithm 136 to predict a future resource usage 210 for computational resource 202b at future time 212. In step 308, capacity optimizing tool 102 determines whether a predicted future resource usage 210 of a computational resource 202a through 202c will exceed the available capacity 204a through 204c of the computational resource. For example, capacity optimizing tool 102 determines whether predicted future resource usage 210 of computational resource 202b (belonging to second subsystem 108b) will exceed capacity 204b of computational resource 202b. If, in step 308, capacity optimizing tool 102 determines that none of the predicted future resource usages 210 of computational resources 202a through 202c will exceed the available capacities 204a through 204c of the computational resources, method 300 returns to step 302, where capacity optimizing tool 102 continues to monitor for events 138.

If, in step 308 capacity optimizing tool 102 determines that a predicted future resource usage 210 of a computational resource 202a through 202c will exceed the corresponding capacity 204a through 204c of the computational resource, in step 310 capacity optimizing tool 102 increases the capacity of the computational resource. For example, if, in step 308 capacity optimizing tool 102 determines that a predicted future resource usage 210 of computational resource 202b will exceed the capacity 204b of computational resource 202b, in step 310 capacity optimizing tool 102 increases capacity 204b by adding resources from buffer 120 to computational resource 202b. In step 312 capacity optimizing tool 102 determines whether the subsystem 108 to which the computational resource with the newly increased capacity belongs is attempting to transmit data 116/118 to another subsystem 108. For example, capacity optimizing tool 102 determines whether second subsystem 108b is attempting to transmit data 118 to third subsystem 108c. If, in step 312 capacity optimizing tool 102 determines that the subsystem 108 to which the computational resource with the newly increased capacity belongs is not attempting to transmit data 116/118 to another subsystem 108, in step 322 capacity optimizing tool 102 monitors the resource usages of computational resources 202a through 202c.

If, in step 312 capacity optimizing tool 102 determines that the subsystem 108 to which the computational resource with the newly increased capacity belongs is attempting to transmit data 116/118 to another subsystem 108, in step 314 capacity optimizing tool 102 determines whether receiving and/or processing data 116/118 is likely to overwhelm the computational resources of the subsystem 108 at a future time. For example, capacity optimizing tool 102 determines whether receiving and/or processing data 118 is likely to overwhelm computational resources 202c of third subsystem 108c at a future time. If, in step 314 capacity optimizing tool 102 determines that receiving and/or processing data 116/118 is not likely to overwhelm the computational resources of the subsystem 108 at a future time, method 300 proceeds to step 322.

If, in step 314 capacity optimizing tool 102 determines that receiving and/or processing data 116/118 is likely to overwhelm the computational resources of the subsystem 108 at a future time, in step 316 capacity optimizing tool 102 prevents data 116/118 from reaching the subsystem 108 before the future time. For example, in response to determining that receiving and/or processing data 118 is likely to overwhelm computational resources 202c of third subsystem 108c at a future time, in step 316 capacity optimizing tool 102 prevents data 118 from reaching third subsystem 108c prior to the future time. In certain embodiments, capacity optimizing tool 102 prevents data 118 from reaching third subsystem 108c by preventing second subsystem 108b from transmitting data 118 to third subsystem 108c. In some embodiments, capacity optimizing tool 102 allows second subsystem 108b to transmit data 118 to third subsystem 108c, but prevents third subsystem 108c from storing data 118 in memory 112c and/or using processor 110c to process data 118. In certain embodiments, capacity optimizing tool 102 redirects data 118 to a storage device external to third subsystem 108c (e.g., resource buffer 120), for temporary storage. In step 318 capacity optimizing tool 102 increases the capacity of the computation resource of the subsystem to which data 116/118 was sent. For example, capacity optimizing tool 102 increases capacity 204c of computational resource 202c of third subsystem 108c by adding resources from buffer 120 to computational resource 202c. In step 320 capacity optimizing tool 102 allows data 116/118 to reach the subsystem 108 to which it was sent. For example, after increasing capacity 204c of computational resource 202c of third subsystem 108c, capacity optimizing tool 102 allows data 118 to reach subsystem 108c. As an example, capacity optimizing tool 102 allows second subsystem 108b to transmit data 118 to third subsystem 108c. As another example, capacity optimizing tool 102 directs data 118 being temporarily stored in a storage device external to third subsystem 108c (e.g., resource buffer 120) back to third subsystem 108c, so that third subsystem 108c may process the data.

In step 322 capacity optimizing tool 102 monitors the resource usages of computational resources 202a through 202c. In step 324 capacity optimizing tool 102 determines whether any of computational resources 202a through 202c have excess capacity. This may occur, for example, after the effects of an event 138 have subsided. Capacity optimizing tool 102 may determine that one or more of computational resources 202a through 202c has excess capacity in any suitable manner. For example, in certain embodiments, capacity optimizing tool 102 may determine that computational resource 202a has excess capacity where the resource usage of computational resource 202a has remained below a given threshold for a set period of time. If, in step 324 capacity optimizing tool 102 determines that none of computational resources 202a through 202c has excess capacity, method 300 returns to step 322. If, in step 324 capacity optimizing tool 102 determines that one or more of computational resources 202a through 202c has excess capacity, in step 326 capacity optimizing tool 102 removes the excess capacity. As an example, in certain embodiments, capacity optimizing tool 102 releases computational resources back to resource buffer 120. As another example, in certain embodiments, capacity optimizing tool 102 transmits an instruction 142 to release computational resources. For example, capacity optimizing tool 102 may transmit an instruction 142 to a hosting provider of subsystems 108a through 108c (e.g., a cloud computing host), for execution by the hosting provider to release excess capacity. In some embodiments, capacity optimizing tool 102 may transmit an instruction 142 to a system administrator 104, instructing the system administrator to physically release computational resources from subsystems 108a through 108c. For instance, in response to receiving an instruction 142 to reduce the capacity of the RAM associated with subsystem 108b, a system administrator 104 may physically remove one or more RAM cards from subsystem 108b.

Modifications, additions, or omissions may be made to method 300 depicted in FIG. 3. Method 300 may include more, fewer, or other steps. For example, steps may be performed in parallel or in any suitable order. While discussed as capacity optimizing tool 102 (or components thereof) performing the steps, any suitable component of system 100, such as device(s) 106, and/or subsystems 108, for example, may perform one or more steps of the method.

III. Sending Alerts to Applications in Shared Environments

Figure 4:
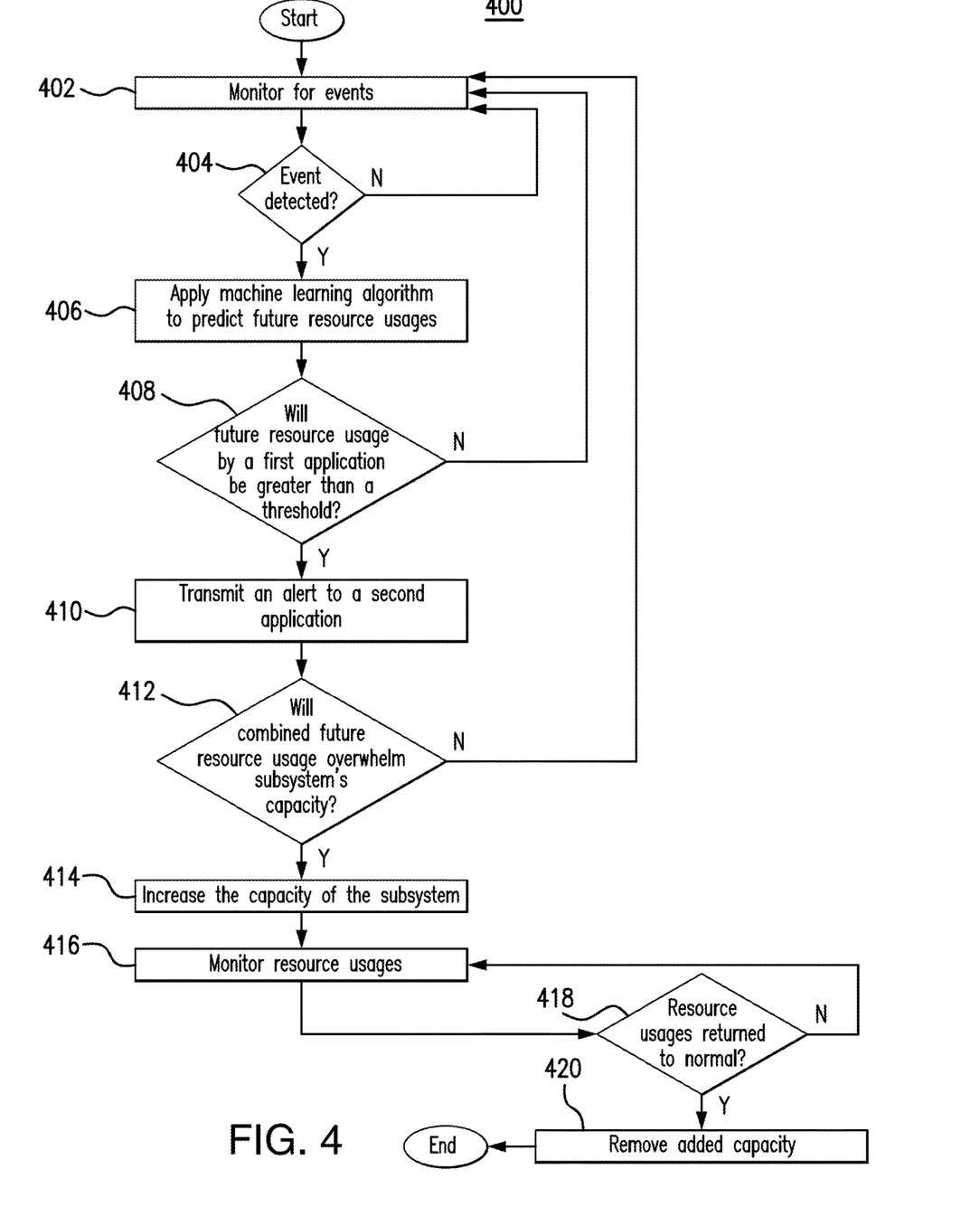
FIG. 4 presents a flowchart illustrating an example method by which the capacity optimizing tool of the system of FIG. 1 generates alerts for applications executing in shared environments, to help prevent predicted future increases in the demands for shared computational resources by one application from adversely affected the other applications.

In certain embodiments, applications 114 that are installed on subsystems 108a through 108c may share computational resources. In such embodiments, increased demand by a first application 114a for shared computational resources 202a may adversely affect a second application 114b executing concurrently with first application 114a on subsystem 108a. FIG. 4 presents a flowchart illustrating an example method 400 by which capacity optimizing tool 102 may generate alerts and otherwise act to help prevent predicted future increases in the demands by a first application for shared computational resources from adversely affected a second application.

In step 402 capacity optimizing tool 102 monitors subsystems 108a through 108c and external server 124 for events 138 that may lead to increased demand on computational resources 202a through 202c. In step 404 capacity optimizing tool 102 determines whether the tool has detected any such events 138. If, in step 404 capacity optimizing tool 102 determines that it has detected an event 138 that may lead to an increased demand on any of computational resources 202a through 202c, in step 406 capacity optimizing tool 102 applies machine learning algorithm 136 to predict application-specific future resource usages 210 of computational resources 202a through 202c. For example, capacity optimizing tool 102 may apply machine learning algorithm 136 to predict future resource usages of computational resource 202a at a future time 212 by (1) first application 114a and (2) second application 114b. In step 408 capacity optimizing tool 102 determines whether any of the predicted application-specific future resource usages are greater than a threshold. As an example, in certain embodiments where first application 114a and second application 114b generally share computational resource 202a approximately equally, capacity tool 102 may determine whether: (1) the predicted future resource usage of computational resource 202a by first application 114a is greater than half of the total capacity 204a of computational resource 202a, and/or (2) the predicted future resource usage of computational resource 202a by second application 114b is greater than half of the total capacity 204a of computational resource 202a. If, in step 408 capacity optimizing tool 102 determines that none of the predicted application-specific future resource usages are greater than the threshold, method 400 returns to step 402.

If, in step 408 capacity optimizing tool 102 determines that one or more of the predicted application-specific future resource usages are greater than the threshold, in step 410 capacity optimizing tool 102 transmits an alert 142 to any applications 114 sharing the same computational resources as the application(s) 114 associated with these predicted future resource usages. For example, if, in step 408 capacity optimizing tool 102 determines that the predicted future resource usage of computational resource 202a by first application 114a is greater than the threshold, in step 410 capacity optimizing tool 102 transmits an alert 142 to second application 114b. Alert 142 may include any suitable information. As an example, in certain embodiments, alert 142 indicates to second application 114b that the usage of shared computational resource 202a by first application 114a is expected to increase at a future time. As another example, in certain embodiments, alert 142 indicates to second application 114b that the usage of shared computational resource 202a by first application 114a is expected to remain above a threshold for a period of time. In some such embodiments, alert 142 includes instructions for second application 114b to pause execution over that period of time.

In step 412 capacity optimizing tool 102 determines whether any of the total predicted future resource usages of one or more of computational resources 202a through 202c will exceed the corresponding capacities 204a through 204c of the computational resources. For example, capacity optimizing tool 102 may determine whether the total predicted future resource usage of computational resource 202a will exceed capacity 204a of computational resource 202a, where the total predicted future resource usage of computational resource 202a includes the predicted future resource usage of computational resource 202a by first application 114a and the predicted future resource usage of computational resource 202a by second application 114b. If, in step 412 capacity optimizing tool 102 determines that none of the total predicted future resource usages for any of computational resources 202a through 202c will exceed the corresponding capacities 204a through 204c of the computational resources, method 400 returns to step 402.

If, in step 412 capacity optimizing tool 102 determines that the total predicted future resource usages of one or more of computational resources 202a through 202c will exceed the corresponding capacities 204a through 204c of the computational resources, in step 414 capacity optimizing tool 102 increases the capacities of those computational resources. For example, if, in step 412 capacity optimizing tool 102 determines that the total predicted future resource usage of computational resource 202a will exceed capacity 204a (as an example, the predicted future resource usage of computational resource 202a by first application 114a will exceed capacity 204a), in step 414 capacity optimizing tool 102 increases capacity 204a by adding resources from buffer 120 to computational resource 202a.

In step 416 capacity optimizing tool 102 monitors the resource usages of computational resources 202a through 202c. In step 418 capacity optimizing tool 102 determines whether any of computational resources 202a through 202c have excess capacity. For example, in certain embodiments, capacity optimizing tool 102 may determine that computational resource 202a has excess capacity where the resource usage of computational resource 202a has remained below a given threshold for a set period of time. If, in step 418 capacity optimizing tool 102 determines that none of computational resources 202a through 202c have excess capacity, method 400 returns to step 416. If, in step 418 capacity optimizing tool 102 determines that one or more of computational resources 202a through 202c has excess capacity, in step 420 capacity optimizing tool 102 removes the excess capacity. As an example, in certain embodiments, capacity optimizing tool 102 releases computational resources back to resource buffer 120. As another example, in certain embodiments, capacity optimizing tool 102 transmits an instruction 142 to release computational resources. For example, capacity optimizing tool 102 may transmit an instruction 142 to a hosting provider of subsystems 108a through 108c (e.g., a cloud computing host), for execution by the hosting provider to release excess capacity. In some embodiments, capacity optimizing tool 102 may transmit an instruction 142 to a system administrator 104, instructing the system administrator to physically release computational resources from subsystems 108a through 108c. For instance, in response to receiving an instruction 142 to reduce the capacity of the RAM associated with subsystem 108a, a system administrator 104 may physically remove one or more RAM cards from subsystem 108b.

Modifications, additions, or omissions may be made to method 400 depicted in FIG. 4. Method 400 may include more, fewer, or other steps. For example, steps may be performed in parallel or in any suitable order. While discussed as capacity optimizing tool 102 (or components thereof) performing the steps, any suitable component of system 100, such as device(s) 106, and/or subsystems 108, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. A system comprising:
a first subsystem comprising a first computational resource having a capacity and associated with a resource usage;
a database configured to store training data comprising:
a set of historical data for the first subsystem, the set of historical data comprising values of the resource usage of the first computational resource over a period of time; and
a first set of historical events, each historical event of the first set of historical events occurring at an event time and associated with an increase in the resource usage of the first computational resource occurring at a time later than the event time;
a memory configured to store a machine learning algorithm, the machine learning algorithm trained, based on the training data, to predict, based on the occurrence of an event, that a future value of the resource usage of the first computational resource at a future time will increase; and
a hardware processor communicatively coupled to the memory, the hardware processor configured to:
detect that the event has occurred; and
in response to detecting that the event has occurred:
apply the machine learning algorithm to predict, based on the occurrence of the event, that the future value of the resource usage of the first computational resource at the future time will increase; and
prior to the future time, increase the capacity of the first computational resource;
wherein:
a first application executing on the first subsystem and a second application executing on the first subsystem share the first computational resource;
the values of the resource usage of the first computational resource over the period of time comprise:
first values of the resource usage of the first computational resource by the first application over the period of time; and
second values of the resource usage of the first computational resource by the second application over the period of time;
the machine learning algorithm is further trained, based on the set of historical data and the first set of historical events, to predict, based on the occurrence of a second event, that a second future value of the resource usage of the first computational resource by the first application at a second future time will be greater than a threshold; and the hardware processor is further configured to:
  detect that the second event has occurred; and
  in response to detecting that the second event has occurred:
    apply the machine learning algorithm to predict, based on the occurrence of the second event, that the second future value of the resource usage of the first computational resource by the first application at the second future time will be greater than the threshold; and
    transmit an alert to the second application, the alert indicating that the resource usage of the first computational resource by the first application is expected to increase.

2. The system of claim 1, wherein the processor is further configured to:
  obtain a value of the resource usage of the first computational resource at a second time greater than the future time;
  determine that the value of the resource usage of the first computational resource at the second time is less than a maximum value of the resource usage of the first computational resource; and
  in response to determining that the value of the resource usage of the first computational resource at the second time is less than the maximum value of the resource usage of the first computational resource, decrease the increased capacity of the first computational resource.

3. The system of claim 1, wherein:
  the machine learning algorithm is further trained, based on the set of historical data and the first set of historical events, to predict, based on the occurrence of the second event, that the resource usage of the first computational resource by the first application will be greater than the threshold for a second period of time, the second period of time comprising the second future time;
  the processor further applies the machine learning algorithm to predict, based on the occurrence of the second event, that the resource usage of the first computation resource by the first application will be greater than the threshold for the second period of time; and
  the alert further comprises an instruction to the second application to pause execution during the second period of time.

4. The system of claim 1, wherein the hardware processor is further configured to:
  predict, based on the second values of the resource usage of the first computational resource by the second application over the period of time ending, a second future value of the resource usage of the first computational resource by the second application at the second future time;
  calculate, by summing the second future value of the resource usage of the first computational resource by the first application and the second future value of the resource usage of the first computational resource by the second application, a combined future value of the resource usage of the first computational resource;
  determine that the combined future value of the resource usage of the first computational resource is greater than a maximum value of the resource usage of the first computational resource, wherein the capacity of the first computational resource corresponds to the maximum value of the resource usage of the first computational resource; and
  in response to determining that the combined future value is greater than the maximum value, prior to the second future time, increase the capacity of the first computational resource, such that the increased capacity of the first computational resource corresponds to a second new maximum value of the resource usage of the first computational resource, the second new maximum value greater that the combined future value.

5. The system of claim 1, further comprising a second subsystem comprising a second computational resource having a capacity and associated with a resource usage, wherein:
  the training data further comprises:
    a set of historical data for a second subsystem, the set of historical data for the second subsystem comprising values of the resource usage of the second computational resource over the period of time; and
    a second set of historical events, each historical event of the second set of historical events occurring at an event time and associated with an increase in the resource usage of the second computational resource occurring at a time later than the event time;
  the machine learning algorithm is further trained, based on the training data, to predict, based on the occurrence of the event, that a future value of the resource usage of the second computational resource at a second future time will increase;
  the processor further applies the machine learning algorithm to predict, based on the occurrence of the event, that the future value of the resource usage of the second computational resource at the second future time will increase; and
  the processor is further configured, prior to the second future time, to increase the capacity of the second computational resource.

6. The system of claim 1, further comprising a second subsystem comprising a second computational resource having a capacity and associated with a resource usage, wherein:
  the training data further comprises:
    a set of historical data for a second subsystem, the set of historical data for the second subsystem comprising values of the resource usage of the second computational resource over the period of time; and
    a second set of historical events, each historical event of the second set of historical events occurring at an event time and associated with an increase in the resource usage of the second computational resource occurring at a time later than the event time; and
  the processor is further configured to:
    in response to increasing the capacity of the first computational resource:
      determine that the first subsystem is scheduled to transmit data to the second subsystem at a second future time;
      predict, based on the set of historical data for the second subsystem, that an available capacity of the second computational resource at the second future time is less than a predicted resource usage of the second computational resource associated with processing the data; and
      in response to predicting that the available capacity of the second computational resource at the second future time is less than the predicted resource usage, prevent the data from reaching the second subsystem.

7. A method comprising:
detecting that an event has occurred;
in response to detecting that the event has occurred:
applying a machine learning algorithm to predict, based on the occurrence of the event, that a future value of a resource usage of a first computational resource at a future time will increase, wherein:
the first computational resource has a capacity and is associated with the resource usage;
the machine learning algorithm is trained, based on training data, to predict, based on the occurrence of the event, that the future value of the resource usage of the first computational resource at the future time will increase:
a set of historical data for a first subsystem, wherein:
the first subsystem comprises the first computational resource; and
the set of historical data comprises values of the resource usage of the first computational resource over a period of time; and
a first set of historical events, each historical event of the first set of historical events occurring at an event time and associated with an increase in the resource usage of the first computational resource occurring at a time later than the event time;
prior to the future time, increasing the capacity of the first computational resource;
wherein:
a first application executing on the first subsystem and a second application executing on the first subsystem share the first computational resource;
the values of the resource usage of the first computational resource over the period of time comprise:
first values of the resource usage of the first computational resource by the first application over the period of time; and
second values of the resource usage of the first computational resource by the second application over the period of time;
the machine learning algorithm is further trained, based on the set of historical data and the first set of historical events, to predict, based on the occurrence of a second event, that a second future value of the resource usage of the first computational resource by the first application at a second future time will be greater than a threshold; and
the method further comprises:
detecting that the second event has occurred; and
in response to detecting that the second event has occurred:
applying the machine learning algorithm to predict, based on the occurrence of the second event, that the second future value of the resource usage of the first computational resource by the first application at the second future time will be greater than the threshold; and
transmitting an alert to the second application, the alert indicating that the resource usage of the first computational resource by the first application is expected to increase.

8. The method of claim 7, further comprising:
obtaining a value of the resource usage of the first computational resource at a second future time greater than the future time;
determining that the value of the resource usage of the first computational resource at the second future time is less than a maximum value of the resource usage of the first computational resource; and
in response to determining that the value of the resource usage of the first computational resource at the second time is less than the maximum value of the resource usage of the first computational resource, decreasing the increased capacity of the first computational resource.

9. The method of claim 7, wherein:
the machine learning algorithm is further trained, based on the set of historical data and the first set of historical events, to predict, based on the occurrence of the second event, that the resource usage of the first computational resource by the first application will be greater than the threshold for a second period of time, the second period of time comprising the second future time;
applying the machine learning algorithm is further performed to predict, based on the occurrence of the second event, that the resource usage of the first computation resource by the first application will be greater than the threshold for the second period of time; and
the alert further comprises an instruction to the second application to pause execution during the second period of time.

10. The method of claim 7, further comprising:
predicting, based on the second values of the resource usage of the first computational resource by the second application over the period of time, a second future value of the resource usage of the first computational resource by the second application at the second future time;
calculating, by summing the second future value of the resource usage of the first computational resource by the first application and the second future value of the resource usage of the first computational resource by the second application, a combined future value of the resource usage of the first computational resource;
determining that the combined future value of the resource usage of the first computational resource is greater than a maximum value of the resource usage of the first computational resource, wherein the capacity of the first computational resource corresponds to the maximum value of the resource usage of the first computational resource; and
in response to determining that the combined future value is greater than the maximum value, and prior to the second future time, increasing the capacity of the first computational resource, such that the increased capacity of the first computational resource corresponds to a second new maximum value of the resource usage of the first computational resource, the second new maximum value greater that the combined future value.

11. The method of claim 7, wherein:
the training data further comprises:
a set of historical data for a second subsystem, wherein:
the second subsystem comprises a second computational resource having a capacity and associated with a resource usage; and
the set of historical data for the second subsystem comprises values of the resource usage of the second computational resource over the period of time; and
a second set of historical events, each historical event of the second set of historical events occurring at an event time and associated with an increase in the resource usage of the second computational resource occurring at a time later than the event time;

the machine learning algorithm is further trained, based on the training data, to predict, based on the occurrence of the event, that a future value of the resource usage of the second computational resource at a second future will increase;

applying the machine learning algorithm is further performed to predict, based on the occurrence of the event, that the future value of the resource usage of the second computational resource at the second future time will increase; and the method further comprises, prior to the second future time, increasing the capacity of the second computational resource.

12. The method of claim 7, wherein:

the training data further comprises a set of historical data for a second subsystem, wherein:
the second subsystem comprises a second computational resource having a capacity and associated with a resource usage; and the method further comprises:
in response to increasing the capacity of the first computational resource:
determining that the first subsystem is scheduled to transmit data to the second subsystem at a second future time;
predicting, based on the set of historical data for the second subsystem, that an available capacity of the second computational resource at the second future time is less than a predicted resource usage of the second computational resource associated with processing the data; and
in response to predicting that the available capacity of the second computational resource at the second future time is less than the predicted resource usage, preventing the data from reaching the second subsystem.

13. An apparatus comprising:

a memory configured to store a machine learning algorithm, the machine learning algorithm trained, based on training data, to predict, based on an occurrence of an event, that a future value of a resource usage of a first computational resource at a future time will increase, wherein:
the first computational resource has a capacity and is associated with the resource usage; and
the training data comprises:
a set of historical data for a first subsystem, wherein:
the first subsystem comprises the first computational resource; and
the set of historical data comprises values of the resource usage of the first computational resource over a period of time; and
a first set of historical events, each historical event of the first set of historical events occurring at an event time and associated with an increase in the resource usage of the first computational resource occurring at a time later than the event time; and a hardware processor communicatively coupled to the memory, the hardware processor configured to:
detect that the event has occurred; and
in response to detecting that the event has occurred:
apply the machine learning algorithm to predict, based on the occurrence of the event, that the future value of the resource usage of the first computational resource at the future time will increase; and
prior to the future time, increase the capacity of the first computational resource;

wherein:
a first application executing on the first subsystem and a second application executing on the first subsystem share the first computational resource;
the values of the resource usage of the first computational resource over the period of time comprise:
first values of the resource usage of the first computational resource by the first application over the period of time; and
second values of the resource usage of the first computational resource by the second application over the period of time;
the machine learning algorithm is further trained, based on the set of historical data and the first set of historical events, to predict, based on the occurrence of a second event, that a second future value of the resource usage of the first computational resource by the first application at a second future time will be greater than a threshold; and
the hardware processor is further configured to:
detect that the second event has occurred; and
in response to detecting that the second event has occurred:
apply the machine learning algorithm to predict, based on the occurrence of the second event, that the second future value of the resource usage of the first computational resource by the first application at the second future time will be greater than the threshold; and
transmit an alert to the second application, the alert indicating that the resource usage of the first computational resource by the first application is expected to increase.

14. The apparatus of claim 13, wherein the processor is further configured to:
obtain a value of the resource usage of the first computational resource at a second time greater than the future time;
determine that the value of the resource usage of the first computational resource at the second time is less than a maximum value of the resource usage of the first computational resource; and
in response to determining that the value of the resource usage of the first computational resource at the second time is less than the maximum value of the resource usage of the first computational resource, decrease the increased capacity of the first computational resource.

15. The apparatus of claim 13, wherein:
the machine learning algorithm is further trained, based on the set of historical data and the first set of historical events, to predict, based on the occurrence of the second event, that the resource usage of the first computational resource by the first application will be greater than the threshold for a second period of time, the second period of time comprising the second future time;
the processor further applies the machine learning algorithm to predict, based on the occurrence of the second event, that the resource usage of the first computation resource by the first application will be greater than the threshold for the second period of time; and the alert further comprises an instruction to the second application to pause execution during the second period of time.

16. The apparatus of claim 13, wherein the hardware processor is further configured to:
predict, based on the second values of the resource usage of the first computational resource by the second application over the period of time, a second future value of the resource usage of the first computational resource by the second application at the second future time;
calculate, by summing the second future value of the resource usage of the first computational resource by the first application and the second future value of the resource usage of the first computational resource by the second application, a combined future value of the resource usage of the first computational resource;
determine that the combined future value of the resource usage of the first computational resource is greater than a maximum value of the resource usage of the first computational resource, wherein the capacity of the first computational resource corresponds to the maximum value of the resource usage of the first computational resource; and
in response to determining that the combined future value is greater than the maximum value, prior to the second future time, increase the capacity of the first computational resource, such that the increased capacity of the first computational resource corresponds to a second new maximum value of the resource usage of the first computational resource, the second new maximum value greater that the combined future value.

17. The apparatus of claim 13, wherein:
the training data further comprises:
a set of historical data for a second subsystem, wherein:
the second subsystem comprises a second computational resource having a capacity and associated with a resource usage; and
the set of historical data for the second subsystem comprises values of the resource usage of the second computational resource over the period of time; and
a second set of historical events, each historical event of the second set of historical events occurring at an event time and associated with an increase in the resource usage of the second computational resource occurring at a time later than the event time;
the machine learning algorithm is further trained, based on the training data, to predict, based on the occurrence of the event, that a future value of the resource usage of the second computational resource at a second future time will increase;
the processor further applies the machine learning algorithm to predict, based on the occurrence of the event, that the future value of the resource usage of the second computational resource at the second future time will increase; and
the processor is further configured, prior to the second future time, to increase the capacity of the second computational resource.

* * * * *